Figure 5:
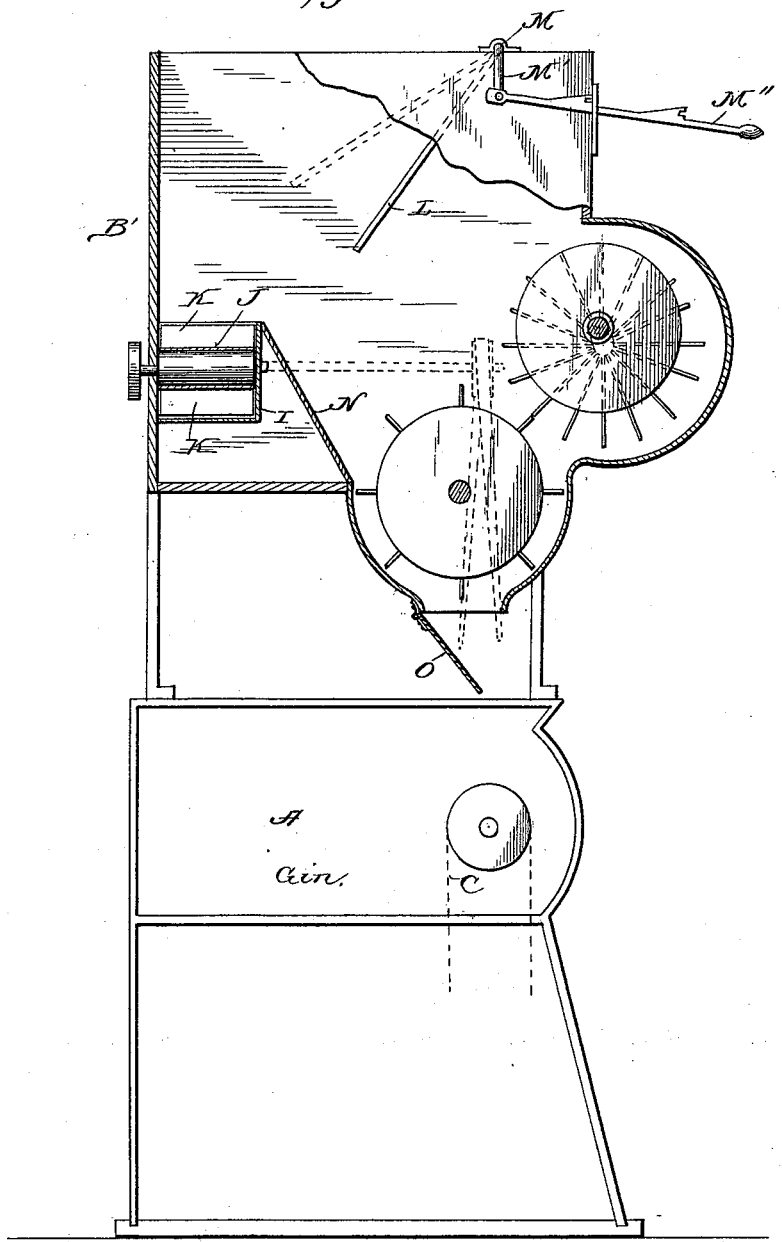

(No Model.) 3 Sheets—Sheet 1.
W. E. ELAM.
MACHINE FOR HANDLING AND CLEANING SEED COTTON.
No. 518,315. Patented Apr. 17, 1894.
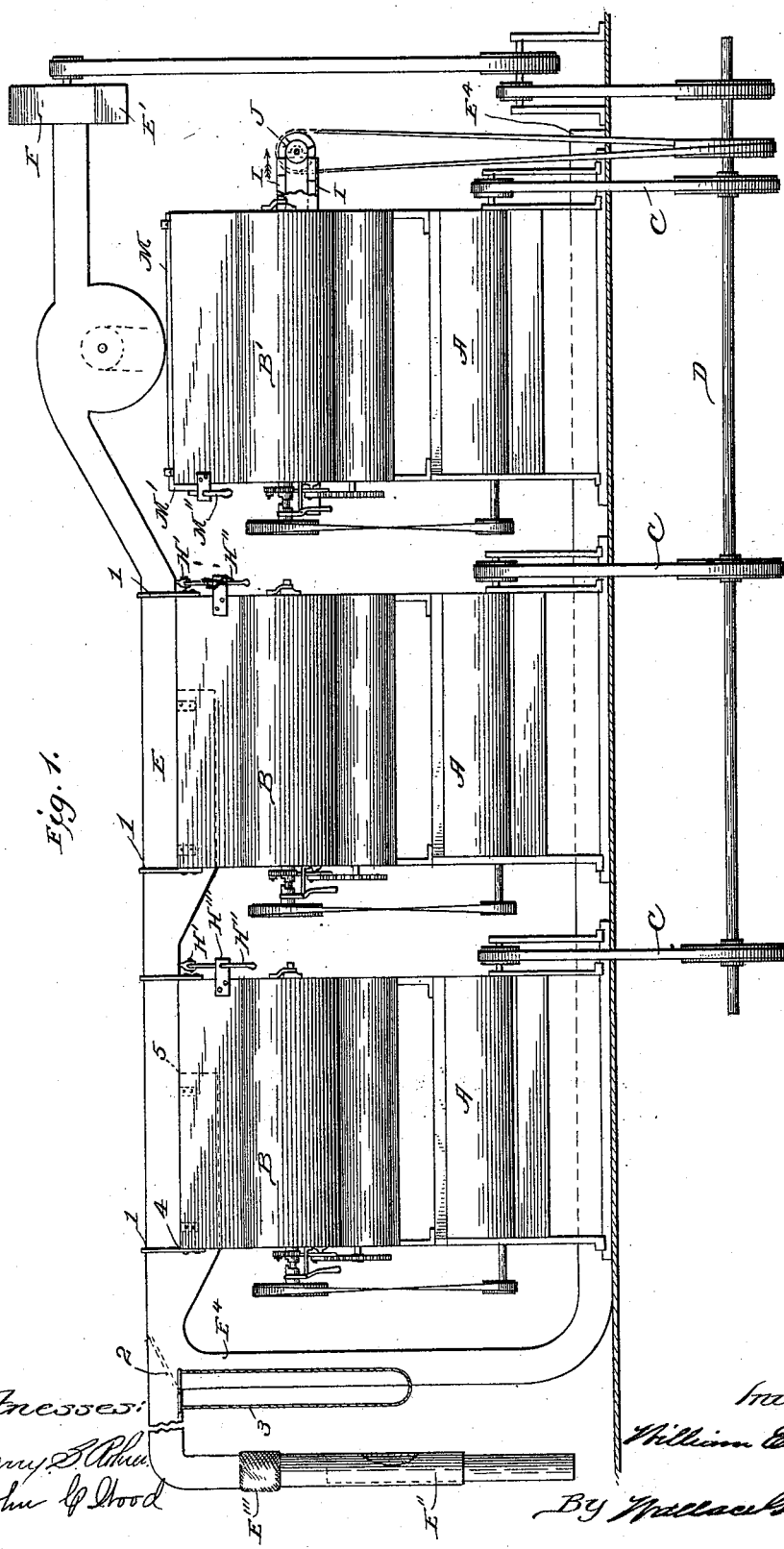

(No Model.) 3 Sheets—Sheet 2.
W. E. ELAM.
MACHINE FOR HANDLING AND CLEANING SEED COTTON.
No. 518,315. Patented Apr. 17, 1894.
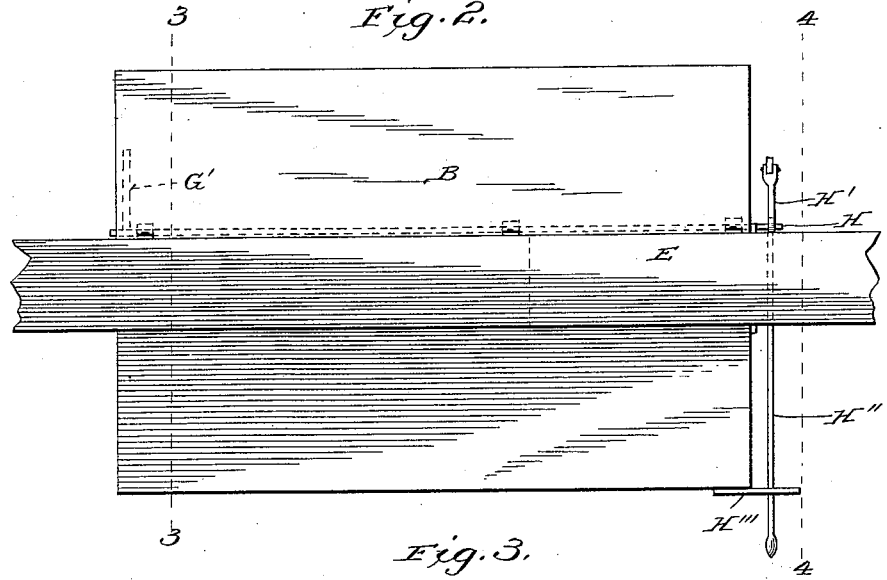
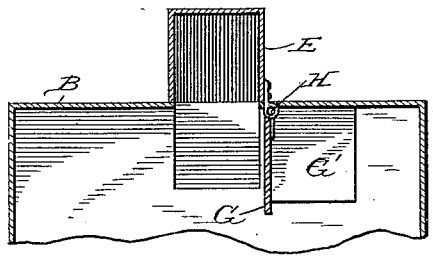
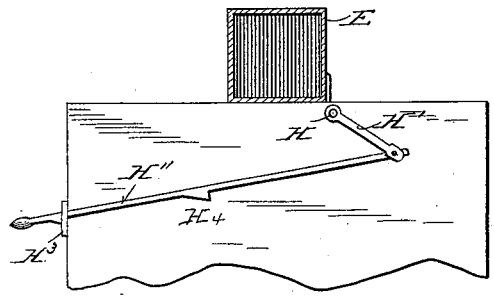
Witnesses:
Harry T. Rohrer
John C. Wood
Inventor:
William E. Elam
By Wallace Greene
Atty.

(No Model.) 3 Sheets—Sheet 3.

W. E. ELAM.
MACHINE FOR HANDLING AND CLEANING SEED COTTON.

No. 518,315. Patented Apr. 17, 1894.

Witnesses:
Harry B. Rohrer
John C. Wood

Inventor:
William E. Elam
By Wallace Greene
Atty.

UNITED STATES PATENT OFFICE.

WILLIAM E. ELAM, OF DALLAS, TEXAS, ASSIGNOR OF TWO-THIRDS TO ROBERT S. THOMAS AND SAUNIE W. HARDWICK, OF SAME PLACE.

MACHINE FOR HANDLING AND CLEANING SEED-COTTON.

SPECIFICATION forming part of Letters Patent No. 518,315, dated April 17, 1894.

Application filed April 6, 1893. Serial No. 469,288. (No model.)

*To all whom it may concern:*

Be it known that I, WILLIAM E. ELAM, a citizen of the United States, residing at Dallas, in the county of Dallas and State of Texas, have invented certain new and useful Improvements in Machines for Handling and Cleaning Seed-Cotton; and I do hereby declare the following to be a full, clear, and exact description of the invention, such as will enable others skilled in the art to which it appertains to make and use the same.

For unloading cotton from wagons and for transferring it from place to place, for example, from wagon to storehouse or from the wagon or the storehouse to the gin house when it is to be delivered to gins or gin feeders, pneumatic apparatus has advantages over other devices. It is however desirable that the cotton shall not pass through the current creating devices, and practically that the current should be an exhaust or suction current. It has heretofore been proposed to combine such pneumatic apparatus with gins, gin feeders, and intermediate devices in such manner that the gins may be fed at any desired rate, no matter what the quantity of cotton carried by the pneumatic apparatus if, only, the quantity be sufficient. It is further desirable to have each gin fed in such manner that any or all the gins may be cut out and stopped without interfering with the working of the remainder of the apparatus, and to have the feeding of each gin graduated independently of the feed of the others. It is further desirable to have the apparatus simpler, less expensive, less liable to derangement, and more certain and uniform in operation than apparatus heretofore used. These results are all among the objects of this invention.

In the accompanying drawings,—Figure 1 is a side elevation of a series of gins with the pneumatic and mechanical devices connected therewith in this apparatus. Fig. 2 is a plan view of one of the gin feeders. Fig. 3 is a section on the line 3—3, Fig. 2, looking to the left. Fig. 4 is a section on the line 4—4, Fig. 2, looking also to the left. Fig. 5 is a sectional elevation of the gin feeder seen on the right in Fig. 1.

In the drawings, A, A are gins situated in a gin house but not herein described in detail, and B, B are feeders described in my application, Serial No. 466,774, now pending in the Patent Office and having in the lower part of the box and alongside that part novel feeding mechanism that is not material to this application, such parts as are here shown being intended to represent merely feeding mechanism in general, located somewhat below the upper part of the feeder box.

B' is a feeder having such novelty as hereinafter appears.

Each feeder rests upon a gin and is driven by it while the gin itself is actuated by a belt C from a power shaft D, shown as below the gins. Secured to the tops of the feeders, by clips 1, is a pneumatic tube E which bends upward to pass over the feeder B' to a fan F which creates in the tube a current in the direction of the arrow. The fan is actuated from the power shaft by ordinary belt and pulley connections arranged to give high speed, and from it a tube E passes to a point without the gin house to convey away the air and dust. At the other end of the apparatus the tube connects with a dependent telescopic pipe E'' having a flexible section or joint E'''. This pipe is outside the gin house and is intended to take cotton from a wagon or other source of supply. To the left of the first gin a tube $E^4$ branches from the tube E and passes by any convenient path to a point a little to the right of the last feeder to take up at intervals the surplus cotton that is deposited at this point by means to be described. At the junction of the tubes E, $E^4$ is a valve 2, operated by an external cross bar and dependent cord 3 and serving to close the tube $E^4$ and leave the passage to the left through the tube E unobstructed, or vice versa.

At the left of each feeder B the tube E is enlarged and the enlargement communicates laterally with the feeder, the wall of the latter being cut away at this point. The lower side of the tube is cut away between the points 4, 5 so that the tube may here also communicate with the feeder whose top and sides are otherwise closed. Some portion, then, of the cotton passing in the tube will fall into each of these feeders, and the certainty and uniformity of such deposit are remarkably increased by the enlargement of the tube at the point indicated. Cotton not delivered to these feeders passes on to a point over the feeder B' where it is removed laterally from the tube and dropped into the feeder below by devices already well known in this art and not herein claimed,—they being such as are shown in prior patents for the same purpose.

To regulate or cut off entirely the cotton supplied to each of the feeders B, without interfering with the rest of the apparatus, a board G is fixed to a rod H pivotally mounted at the rear lower side of the tube in such manner that it normally hangs vertical, but by rotation of the rod is swung forward and upward to wholly or partially close the passage from the tube to the feeder. The board G bears at its left end a rigid wing G' which, when the board swings as just described, closes the lateral opening into the enlargement of the tube. Thus by swinging the board and its wing the feeder is completely "cut out," and both gin and feeder may be stopped while the remainder of the apparatus is in operation.

Obviously a partial closing regulates the supply of cotton but does not wholly exclude it.

The rod H is rotated by means of a crank arm H' to the free end of which is secured a handle bar H'' running through a guide plate H³ fixed to the front part of the feeder. When the handle bar is drawn forward the rod is rotated and the board swings forward with it, and if the teeth H⁴ upon the bar H'' be allowed to engage the guide, the board is secured against accidental displacement.

In the rear part of the feeder B', which is upwardly open, is mounted an open trough I in which runs an endless belt J having wings K that nearly fit the trough. The belt is carried upon the usual drums and is shown as driven by a quarter turned belt from a pulley upon the power shaft D. It projects through the walls of the feeder and, running in the direction of the arrow, drops such cotton as it may receive near the open end of the tube E⁴, which at any time desired takes it again into the tube E if the valve 2 be properly set. Cotton dropped from the separator does not, however, normally fall upon this conveyer, but in front of it, where it is fed to the gin below by devices not important in this connection. If such devices do not dispose of the cotton as fast as it arrives, the feeder is filled above the level of the conveyer and the further excess slips or rolls upon the latter and is taken by it to the mouth of the tube E⁴. To avoid lodgment of the cotton, a board N extends from the upper front edge of the conveyer trough obliquely forward to the bottom of the feeder as shown. It may be desirable to cut out this feeder and gin also, and for this purpose a rod M is mounted upon the front part of the top of the feeder and provided with a crank arm M' and a toothed handle bar M'', analogous to the parts by which the boards G are actuated, as above described.

To this rod is fixed a board L, normally only moderately inclined, but which, by pressing the handle bar inward, may be swung upward until its free edge is nearly over the front side of the conveyer. In this position it deflects all the cotton falling into the feeder and throws it upon the conveyer to be deposited at the end of the tube E⁴. In other words, the feeding mechanism and the gin are completely cut out.

Each of the feeders B, B' is provided with a hinged board O at the bottom which normally guides the cotton into the gin below but which may be swung upward to close the feeder at the bottom and prevent the influx of air in case the fan be operated when there is little or no cotton in the feeder. The board L may be moved or set by an attendant, but it is also automatic in its action. Normally, it lies without the path of the falling cotton or is so inclined as to throw the latter against the board N whence it passes to the feeding devices. These, when the cotton supplied exceeds that taken by the gin, force the excess beneath the board and the latter is raised higher and higher until at last all the cotton is thrown upon the conveyer, if the supply be extremely rapid or copious. As soon, however, as the supply diminishes to a rate below the capacity of the gin, the feeding devices lessen the accumulation and the board gradually falls to its normal position, throwing less and less upon the conveyer and at last allowing all to pass to the feeding devices.

What I claim is—

1. The combination with a gin, a feeder thereon, a pneumatic cotton conveying tube crossing the top of the feeder and communicating therewith through an opening adapted to distribute the falling cotton over approximately the whole length of the ginning mechanism beneath, a board arranged to move in a plane transverse to the tube to wholly or partially close said opening, and means for fixing the board at different points in its path; whereby changing the position of the board regulates the supply of cotton while maintaining an even distribution to all the saws.

2. The combination with a gin feeder box, of a cotton conveying pneumatic tube communicating vertically therewith and provided with an enlargement opening laterally into said box, and a closure arranged to govern both lateral and vertical communication between the box and the tube.

3. The combination with the closed or covered feeder box, of the pneumatic tube above the same, communicating vertically therewith, and provided with an enlargement fitting the side of the box and opening through the same, and the hinged board and wing arranged to swing upward for partially or wholly closing communication between the box and the tube.

4. The combination with an upwardly open feeder box and means for dropping cotton into the same, of an open conveyer running across the feeder box at one side of the normal path of the falling cotton and adapted to carry from the box cotton that may be placed upon it.

5. The combination with the upwardly open feeder box, of devices for dropping cotton into the same, a transverse conveyer located at one side of the falling cotton, feeding mechanism arranged to receive the falling cotton and pass it downward out of the box, and an adjustable deflector operating to divert the falling cotton from the feeding mechanism to the transverse conveyer.

In testimony whereof I affix my signature in presence of two witnesses.

W. E. ELAM.

Witnesses:
S. H. McBRIDE,
J. F. REIGER.